Jan. 14, 1958     E. WILDHABER     2,819,597
UNIVERSAL JOINT DRIVE Original Filed July 2, 1949     5 Sheets-Sheet 1

INVENTOR.
ERNEST WILDHABER
BY
ATTORNEY

INVENTOR.
ERNEST WILDHABER

Jan. 14, 1958  E. WILDHABER  2,819,597
UNIVERSAL JOINT DRIVE
Original Filed July 2, 1949  5 Sheets-Sheet 3

INVENTOR.
ERNEST WILDHABER
BY
ATTORNEY

Jan. 14, 1958　　　　　E. WILDHABER　　　　　2,819,597
UNIVERSAL JOINT DRIVE

Original Filed July 2, 1949　　　　　5 Sheets-Sheet 4

INVENTOR.
ERNEST WILDHABER
BY
ATTORNEY

United States Patent Office 2,819,597
Patented Jan. 14, 1958

2,819,597

UNIVERSAL JOINT DRIVE

Ernest Wildhaber, Brighton, N. Y.

Original application July 2, 1949, Serial No. 102,788, now Patent No. 2,709,902, dated June 7, 1955. Divided and this application April 8, 1955, Serial No. 500,156

24 Claims. (Cl. 64—21)

The present invention relates to universal joint drives having one or more universal joints and connecting shafts, and further to a novel uniform-motion type universal joint. In a further aspect, the invention relates to universal joint drives involving two or more universal joints in which the axes of the end shafts may move in any direction. This application is a division of my pending application Serial No. 102,788, filed July 2, 1949, now Patent No. 2,709,902, granted June 7, 1955.

The Cardan universal joint is known to transmit motion at a varying rate at substantial shaft angularities. It gives a periodical acceleration and deceleration depending on the turning angle or phase. While one turn of the driver always corresponds to one turn of the driven member, during each turn there is a periodical departure from uniform motion. At some phases there is an advance over uniform motion position; at other phases there is a lag.

One known form of uniform motion universal joint employs two conventional Cardan joints or their equivalents in series, that is, the power is transmitted first through one and then through the other joint. The two joints must then be constrained to move equally with respect to the short shaft connecting them if uniform motion may be achieved. In this kind of joint, however, each individual joint is under full load. In the special case of a universal joint drive where the end shafts stay parallel, the conventional Cardan joints are capable of transmitting uniform motion if the phases of the two joints are the same. However, at substantial angles the intermediate shaft will turn at a varying rate and produce vibrations through its inertia.

One object of the present invention is to provide a universal joint capable of transmitting uniform or substantially uniform motion which will have high load capacity and no wear or minimum wear.

Another object of the invention is to provide a universal joint drive in which a pair of Cardan joints or the equivalent thereof is employed but in which the joints are used in parallel so that part of the load is transmitted through one joint of the pair and the remainder is transmitted through the other joint.

A further object of the invention is to provide a drive employing two Cardan joint connections or their equivalent of different phase in parallel, and to balance the advance of one phase with the lag of the other phase to achieve virtually uniform motion.

Another object of the invention is to provide a drive employing a pair of Cardan joint connections of different phase in parallel so that the load transmitted through one of said connections by-passes the other connection.

A further object of the invention is to provide a drive employing a pair of Cardan joints in which mass balance may be attained by balancing the dynamic movements of the intermediate shaft, which connects the joints, with the dynamic movements of a coaxial member of different phase.

Another object of the invention is to provide a constant velocity universal joint drive in which two Cardan joints are employed in parallel and the two joints have a phase difference of 90° so that they transmit oppositely varying motion, and practically uniform motion is attained, even at large angularities, through an equalizer that averages the two motions.

Still another object of the invention is to provide a universal joint drive, comprising two or more joints, in which uniform motion may be obtained through use of only a single equalizer.

Other objects of the invention will appear hereinafter from the specification and from the recital of the appended claims.

The principles underlying the present invention will now be described in connection with the showing of Figs. 1 to 5, inclusive.

There are two types of Cardan joints or the equivalent. In one type, diagrammatically shown in Fig. 1, the two shafts 20 and 21, which are connected by the joint, are fixed axially. In the other type, diagrammatically shown in Fig. 2, the shafts 25 and 26 are free to move axially with respect to one another.

Figure 1:
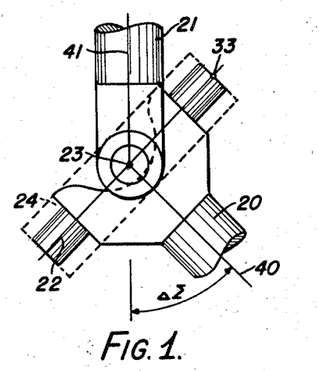
Figs. 1 to 5 are diagrammatic views illustrating the principles underlying the present invention.

In the fixed type, one shaft 20 is connected by a member 24, shown in dotted lines, to the other shaft 21, said connecting member being capable of swinging about an axis 22 disposed at right angles to the axis 40 of the shaft 20, and said connecting member being capable of swinging about an axis 23 which is disposed at right angles to the axis 22 and also at right angles to the axis 41 of shaft 21.

Figure 2:
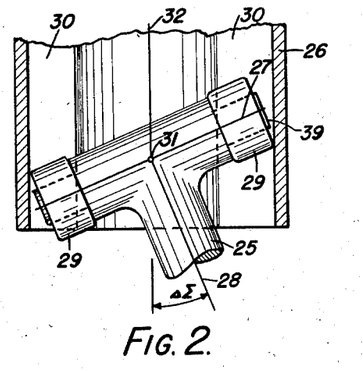
Figure 3:
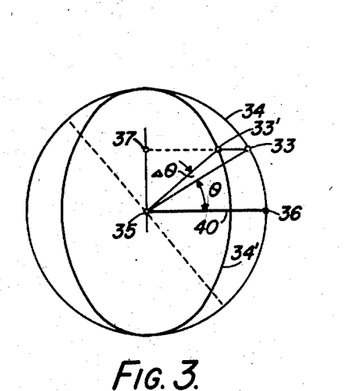

In the free type, one shaft 25 is mounted to rock on a member 39 about an axis 27 which is disposed at right angles to the axis 28 of shaft 25; rollers or sliding blocks 29 are mounted at opposite ends of the member 39; these rollers or blocks engage in slots 30 formed internally in the hollow shaft member 26 parallel to the axis 32 of that shaft; the slots 30 have plane sides extending parallel to axis 32; and the slots 30 permit the member 39 to rock relative to shaft 26 about an axis 31 perpendicular to axis 27 as well as to axis 32. There should also be some centering means to keep the center of connecting member 39 on the axis 32 of shaft 26. Axes 27 and 31 correspond exactly to axes 22 and 23 of the axially fixed type of joint; and in any given axial position, the free type joint transmits exactly the same motion as the fixed type.

For convenience, the known motion transmitted by the Cardan joint will now be derived.

Point 33 of axis 22 (Fig. 1) describes a circle about the axis 40 of shaft 20 when the joint is rotated. This circle 34 (Fig. 3) appears as an ellipse $34^1$ when viewed along the axis 41 of shaft 21. The point of intersection of axes 40 and 41 is shown at 35 in Fig. 3. The axis 41 projects in this Fig. into that point. The axis 40 of shaft 20 projects as a line 35—36. The turning angle $\theta$ of shaft 20 may be conveniently measured from this line. This angle is angle 33—35—36.

Point 33 of circle 34 appears at $33^1$ on ellipse $34^1$. The axis 22 then appears as line $33^1$—35. Axis 23 is perpendicular to axis 22 and in the view of Fig. 3 also appears perpendicular at any turning angle. The turning angle of shaft 21 can be measured by the inclination of line $33^1$—35 to line 35—36, that is, by the angle $33^1$—35—36. It differs from the turning angle $\theta$ by a small angle $\Delta\theta$ which is angle 33—35—$33^1$.

While shaft 20 turns through an angle $\theta$, shaft 21 turns through an angle $(\theta+\Delta\theta)$. If shaft 20 turns uniformly, then angle $\Delta\theta$ represents the departure from uniform motion of shaft 21. This angle will now be determined at any shaft angularity $\Delta\Sigma$ (Fig. 1).

Let distance 35—36=33—35=1

Then:

Distance 33—37=(distance 33—35) cos $\theta$=cos $\theta$

Distance $33^1$—37=cos $\theta \cdot$cos $\Delta\Sigma$

Distance 33—$33^1$=cos $\theta(1-$cos $\Delta\Sigma)$

From triangle 33—$33^1$—35

$$\frac{\sin \Delta\theta}{\sin (\theta+\Delta\theta)}=\frac{33-33^1}{33-35}=\cos \theta(1-\cos \Delta\Sigma)$$

This equation can be transformed into:

$$\tan \Delta\Sigma=\frac{M \sin 2\theta}{1-M \cos 2\theta} \quad (1)$$

Herein M is:

$$M=\frac{1-\cos \Delta\Sigma}{1+\cos \Delta\Sigma}$$

Figure 5:
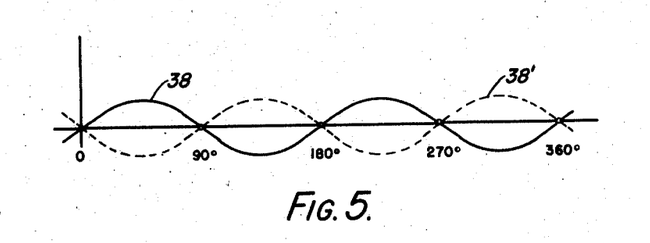

$\Delta\theta$ is seen to depend on an angle double the turning angle $\theta$. Fig. 5 is an illustration thereof. $\Delta\theta$ is plotted vertically as an ordinate; and the turning angle $\theta$ is plotted as the abscissa. The result is curve 38 which repeats every 180 degrees.

It can be shown that the maximum angle $\Delta\theta$, denoted $\Delta\theta_m$, corresponds to the equation:

$$\sin \Delta\theta_m = M \quad (2)$$

This is the maximum advance and the maximum lag from uniform motion.

Fig. 5 also shows a curve $38^1$ in dotted lines. It is the same curve as curve 38 but shifted laterally through 90 degrees, that is, it is a curve of a phase ninety degrees different from curve 38. Its ordinates are opposite to the ordinates of curve 38 and practically equal thereto. The average of the two ordinates, that is, the average of the two angles $\Delta\theta$ having phases ninety degrees apart is practically zero. If we combine the motions of two Cardan joints, then, whose phases are ninety degrees apart, the departure $\Delta\theta$ of one joint from uniform motion will substantially cancel out the departure of the other joint from uniform motion. Thus, through the combination substantially uniform motion will be obtained. It is on this principle and discovery that the present invention is predicated.

Figure 4:
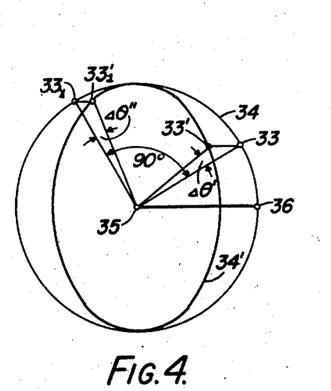

Fig. 4 shows the departure from uniform motion for two turning positions at right angles to each other; and it shows how those departures are opposite and substantially equal, $33_1$ and $33'_1$ corresponding respectively to 33 and 33' for the other turning position and $\Delta\theta'$ and $\Delta\theta''$ denoting the corresponding angles of departure from uniform motion.

According to my invention, two Cardan-type joint connections are used in parallel, side by side, so that each joint connection transmits part of the total torque. These joint connections are of opposite phase; their phases are ninety degrees apart. They produce opposite oscillatory motions as indicated in Fig. 5. An equalizer, such as a differential, combines and averages the motions and transmits it. The averaged motion is practically uniform even at large shaft angularities.

The maximum departure $\Delta\theta_m$ from uniform motion of a Cardan-type joint may be computed with Equation 2 and is:

26',     1° 47',     4° 7', for shaft angles of:

10°,     20°,     30°, respectively. This departure is in either direction, forward and backward. The maximum departure of the motion from uniform motion, when averaged according to the present invention, is found to be:

0,     2',     9', respectively for the above shaft angles. The latter departures are the same as the departures $\Delta\theta_m$ of a conventional Cardan type joint for shaft angularities of:

0,     2° 31',     5° 49', respectively. In other words a universal joint constructed according to the present invention and set to a shaft angle of 20° produces in operation no more departure from uniform motion than exists in a Cardan-type joint set to a shaft angle of 2° 31'. The transmitted motion, therefore, varies very slightly and smoothly. The departure is, in fact, less than takes place in several known types of constant velocity universal joints.

There is a further advantage with my new joint, namely, the load is equally distributed through differential action on both axes of the joints. Each pivot gets an equal share of the total load. Furthermore, this load-distribution is positive, and does not require unduly close tolerances.

Figure 6:
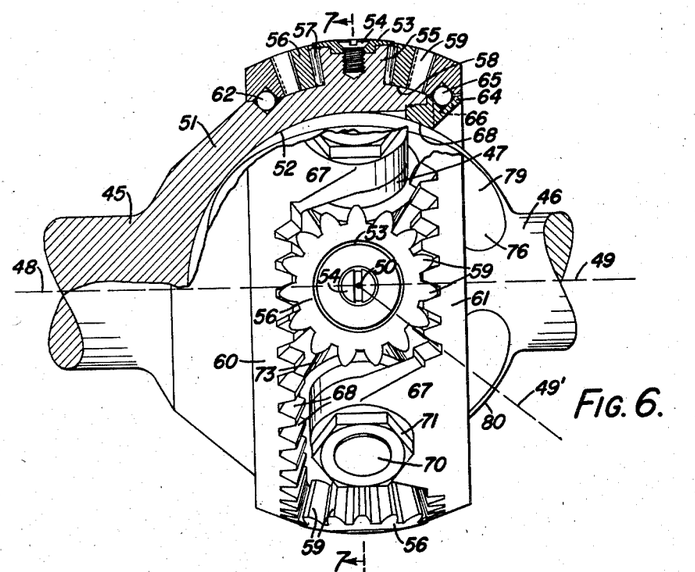
Fig. 6 is a view, with parts broken away and shown in axial section, of a uniform motion universal joint constructed according to one embodiment of my invention.
Figure 7:
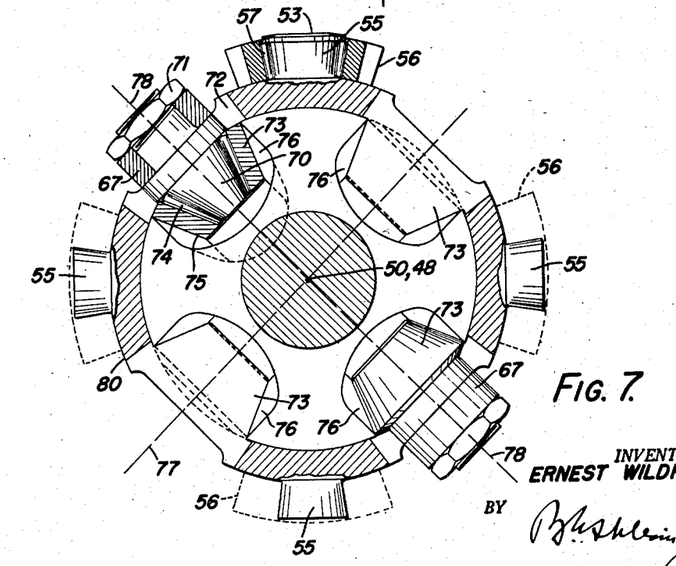
Fig. 7 is partly a section on the line 7—7 of Fig. 6 and partly a view along the joint axis.
Figure 8:
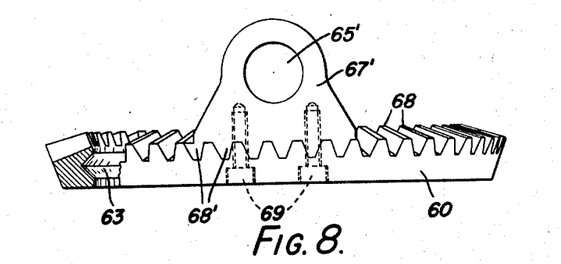
Fig. 8 is a side view, with parts broken away of a modified form of side gear such as may be used in the joint of Figs. 6 and 7.

Figs. 6 to 8 illustrate one embodiment of the invention. This embodiment of my invention is claimed specifically in my pending application Serial No. 102,788 above-mentioned. The present application is directed specifically to the other embodiments of the invention herein disclosed. However, it is thought that a description of the embodiment illustrated in Figs. 6 to 8 inclusive will aid in understanding the scope of the invention; and for this reason reference will be made briefly here first to the embodiment illustrated in Figs. 6 to 8 inclusive.

In Figs. 6 to 8 inclusive, 45 and 46 denote the two shaft elements connected by the joint, denoted as a whole at 47. The shafts have axes 48 and 49 which intersect at center 50. Integral with shaft 45 is a hollow head 51 which has a spherical inside surface 52. Four pins 55 are formed integral with head 51 and project externally thereof. These are equi-spaced about the axis 48 of shaft 45. Bevel pinions 56 are journalled on these pins by means of anti-friction bearings which comprise tapered rollers 57 that are in direct contact with each other so that they require no cage. The roller diameter is made large enough so that the diameter of the four tapered pins 55, at the outside of each, is equal to or smaller than the diameter of the tapered bore of the pinions 56 at the inside of each pinion. The pinions can then be mounted on the pins 55 from the outside. The rollers 57 are then filled in; and the end disc or keepers 58 are then secured in place by screws 54, thus serving to hold the rollers in place axially.

With the tapered design, each pinion 56 is held axially in both directions, outwardly by the tapered rollers 57, and inwardly through bearing contact between the front face 58 of the pinion and the outside surface of head 51. This surface may be made a spherical surface centered at 50. Normally there is no load at this bearing surface. The moderate axial thrust exerted on the pinions by the tooth contact pressure extends outwardly and is taken by the tapered rollers 57. Of course, cylindrical rollers might be used in place of tapered rollers 57, but in this case further provision should be made to take the axial outward thrust.

The pinions 56 have teeth 59 which are preferably straight, or, if curved lengthwise, are preferably made with zero mean spiral angle. The pinions mesh with two bevel side gears 60 and 61 which are mounted for oscillation on the head 51 of shaft 45 about the axis 48 of said shaft. Gear 60 is mounted on head 51 by means of a single ball bearing 62 of large diameter. Its balls engage in race-ways 63 (Fig. 8) of general V-shape in cross-section. A double contact is thereby obtained through which the gear 60 is securely mounted on its axis and is held axially in a fixed position on head 51.

Gear 61 is similarly mounted on a ring-shaped part 64 which threads into head 51 and is locked in position by a set-screw or other suitable means (not shown). The gear 61 is rotatably mounted on ring 64 by means of a ball bearing 65 whose balls engage in race-ways similar to raceway 63 (Fig. 8) formed in gear 60 and head 51. The ball cage may be omitted. The axial profiles of the races are preferably made concave. In assembly, the balls are inserted through a hole 66 (Fig. 6) formed in ring 64, which is plugged after assembly.

Each gear 60 and 61 has two diametrically opposite projections 67 which extend toward the other gear across the space between them. The pins 55, which carry pinions 56, are disposed between adjacent projections 67 of the two gears, as clearly shown in Fig. 7.

In principle the projections 67 may be formed integral with the respective gears 60 and 61. In any case they are rigidly connected to the gears. In one embodiment each gear has teeth 68 all around its periphery, preferably formed teeth. In such case, the projections are constructed as shown at $67^1$ in Fig. 8, being provided with counterpart teeth $68^1$ which fit into and match tooth spaces of the gear. Each projection can then be rigidly secured to the gear by screws 69. Other known means may also be used to secure a rigid connection between the projections and each gear. In the embodiment illustrated in Figs. 6 and 7 the toothed projections 67 are welded to the gear after assembly.

The projections 67 or $67^1$ carry studs which are formed with tapered pins 70. These studs fit into holes, such as shown at $65^1$ in Fig. 8, in the projections, and are rigidly secured in the projections by nuts 71 that thread onto the studs. The studs extend through slots 72 (Fig. 7) formed in head 51 and that are made sufficiently wide to allow the required oscillation of the gears 60 and 61 with respect to head 51.

Tapered rollers 73 are mounted on the pins 70 by means of tapered needle bearing pins 74. The outside working surfaces 75 of the rollers 73 are conical surfaces whose apices lie at center 50. If desired these conical surfaces may be eased off at the profile ends to keep the heavy loads from such ends. If so modified these surfaces have slightly convex axial profiles but may still be called conical surfaces since the main parts of the surfaces are conical.

Rollers 73 engage guideways provided in the head 79 of shaft 46. The guideways 76 are grooves such as may be cut by a milling cutter representing a roller 73 when the rotating cutter is fed about an axis, such as denoted at 77 in Fig. 7, perpendicular to the axis 49 of shaft 46. This axis 77 also passes through center 50. In other words, the grooves 76 extend about center 50 along axial planes; and each point of the cutter axis describes a great circle on a sphere concentric with center 50. Each groove follows a mean plane which is an axial plane.

Contact between a roller and its mating groove is in an axial plane of the roller. The grooves have straight profiles; and their side surfaces are conical surfaces. I preferably use four rollers 73 and four grooves 76 as shown. The grooves are equally spaced about the axis 49 of shaft 46. Two of the rollers are mounted on gear 60; and the other two rollers are carried by gear 61. The two rollers of each gear are coaxial and their common axis constitutes one pivot or axis of the joint.

Head 79 has a spherical outside surface 80 which engages the spherical inside surface 52 of head 51, and the spherical inside surface 68 of ring-shaped part 64 (Fig. 6). These surfaces form the spherical bearing which keeps the two shafts 45 and 46 together.

In the drawings shaft 45 is shown axially aligned with shaft 46. In operation, however, the axis 49 of shaft 46 is ordinarily inclined to the axis 48 of shaft 45. One such inclined position is denoted at 49' in Fig. 6.

In operation, with shaft angularity the two side gears 60, 61 are moved at a varying rate when shaft 46 turns at a constant rate. Each has a Cardan-type joint connection with shaft 46. The phases of the two joint connections differ, however, by ninety degrees since the adjacent slots 76 are ninety degrees apart. As one gear runs ahead of the uniform motion position by an angle $\Delta\theta$, as already explained, then, the other gear lags back of that position at practically the same angle.

The equalizer between the two joint connections is here in the form of a known type of differential gear comprising a head 51, which is equivalent to a spider member, planet pinions 56, and side gears 60, 61. It is well known that in a differential with equal side gears the motion of the planet carrier is the exact average of the motions of the two side gears. In other words, if one side gear runs ahead of the planet carrier a given angle, the other side gear lags back of the planet carrier an equal angle. In the present case, then, the planet carrier, which is head 51 of shaft 45, has the averaged motion of the two side gears. This averaged motion is practically uniform motion when shaft 46 turns uniformly.

Thus, through my invention there is provided a practical uniform motion joint with large load capacity and with true rolling motion in the rollers 73. Under load the rollers contact on the loaded side and roll thereon. There is no sliding between the conical rollers and their grooves 76 at any position. Known means may be used for lubrication and guarding; these require no explanation, and are not shown.

An embodiment of the invention in which the universal joint has axial freedom will now be described with reference to Figs. 9 and 10. In this application of my invention, the structure disclosed in Fig. 6 to 8 may be used except for the rollers 73 and shaft 46. I may use the same shaft element 45 with head 51 and pins 55, the same bevel pinions 56 and the same side gears 60 and 61. I may also use the same ring 64.

In place of shaft element 46 there is here provided a shaft 86 having a head 87. The outside surface of this head contains two spherical surface portions 88, 89 whose centers are at 90 and 91, respectively, on shaft axis 92. The distance between centers 90 and 91 is the total axial freedom of the joint. Shaft 86 can shift axially to the left until center 91 coincides with center 50 of the inside spherical surface 52 of the head 51 of shaft 45 (Figs. 6 to 8). Then it is stopped through contact of its spherical surface 89 with the inside spherical surface 52 shown in dotted lines in Fig. 10. Shaft 86 can shift axially to the right until center 90 coincides with center 50. Then it is stopped by ring 64 (Fig. 6) whose inside spherical surface 68 then comes into contact with spherical surface 88, The spherical surfaces 89 and 52, as well as the spherical surfaces 88 and 68, have approximately equal radii 95.

Definite axial freedom of movement is thus seen to be built into the joint when the shaft 86 having head 87 is used with it instead of shaft 46 which has head 79; yet suitable stops prevent the joint from coming inadvertently apart.

To provide the driving connection in all axial positions of shaft 86, head 87 is provided with grooves 96 whose side walls 97 are planes parallel to and equally distant from axial planes of shaft element 86. These grooves are engaged by cylindrical rollers 99 which are mounted by means of studs, similar to studs 70 (Figs. 6 and 7) on the projections 67 of side gears 60 and 61.

Figures 9, 10:
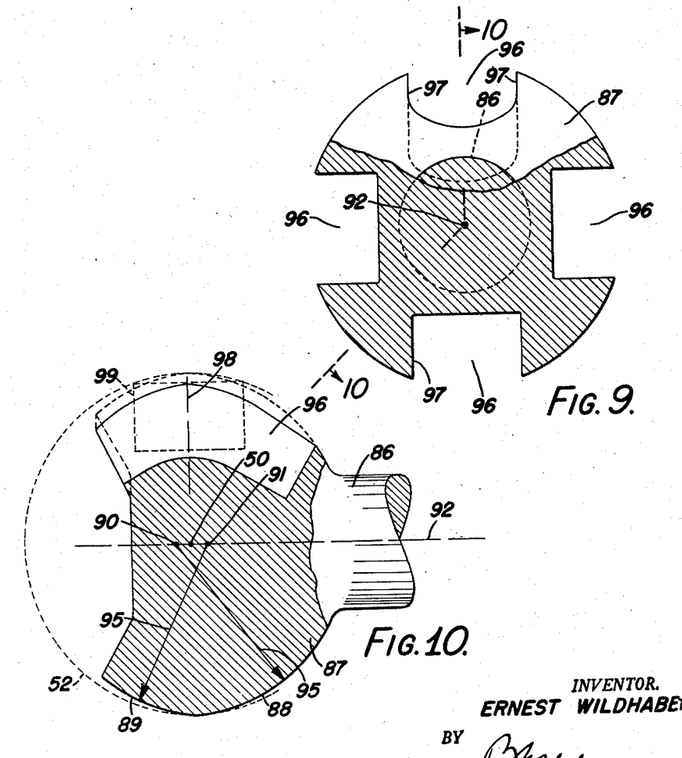
Fig. 9 is a view of the inner element of a modified form of universal joint having axial freedom, the view being partly in section at right angles to the axis and partly a view looking in the direction of the axis.
Fig. 10 is a corresponding cross-section taken on the line 10—10 of Fig. 9.

The relative motion between shaft 86 and the axis 98 of a roller 99 is a turning motion about an axis which intersects axis 92 of shaft 86 and is perpendicular to the plane of Fig. 9. This axis may be anywhere between end positions 90 and 91. The parallel plane side walls 97 of a groove 96 can be considered surfaces of revolution about any such axis, and will operate correctly at any such position of said axis. Whatever point of axis 92 between centers 90 and 91 coincides with center 50, the operative connection through cylindrical rollers 99 and straight-sided grooves 96 is a Cardan-type joint connection. The cylindrical rollers and straight-sided grooves produce exactly the same motion, at any given axial position of shaft 86, as the conical rollers 73 and their mating grooves 76 in the embodiment of the invention disclosed in Figs. 6 and 7. They produce exactly the same motion between the side gears 60 and 61 and shaft 86 as Cardan joints.

Head 87 is self-centered radially and does not require further centering means. The two pivots, which are relatively fixed axially, provide centering in a radial plane through their two pairs of rollers 99.

Broadly, again, a plurality of pivots, or axes of rotation are provided in a joint made according to the present invention which produce motion different in phase. These axes or pivots are perpendicular to the axis 48 of one of the two shafts connected by the joint and intersect said axis in the same point which may be anywhere between centers 90 and 91. They are independently movable about said axis and are fixed axially relatively to said shaft element 45 and to one another. With this arrangement self-centering in all radial positions is obtained.

In the embodiments of Figs. 6 to 10, I have shown full pinions 56 having teeth all around their peripheries. On the gears 60 and 61 I have shown many more teeth than are needed for the operation of my joint which requires only a moderate rocking motion. Many of the teeth may be left off if desired. I may even use a single tooth and a mating tooth space at each meshing point. It is usually cheaper, however, to cut full pinions and gears. Moreover with full pinions and gears hardening distortions, if any, are more uniform around pinion or gear.

My invention is not limited to use in joints for connecting angularly disposed shafts. It may also be applied with advantage in the special case of a universal joint drive which connects shafts that have parallel axes. For this special case, the structure can be simplified.

One such embodiment will now be described with reference to Fig. 11. Another is illustrated in Figs. 12 and 13. The latter modification is ordinarily preferred. In both embodiments, the joint is shown in connection with a drive from a differential, that is secured to the body or frame of an automotive vehicle, to one driven wheel of that vehicle. Such operative connections may be used with independently-sprung driven rear wheels. It should be understood, however, that these embodiments are not confined to such use but are broadly applicable.

Figures 11, 13:
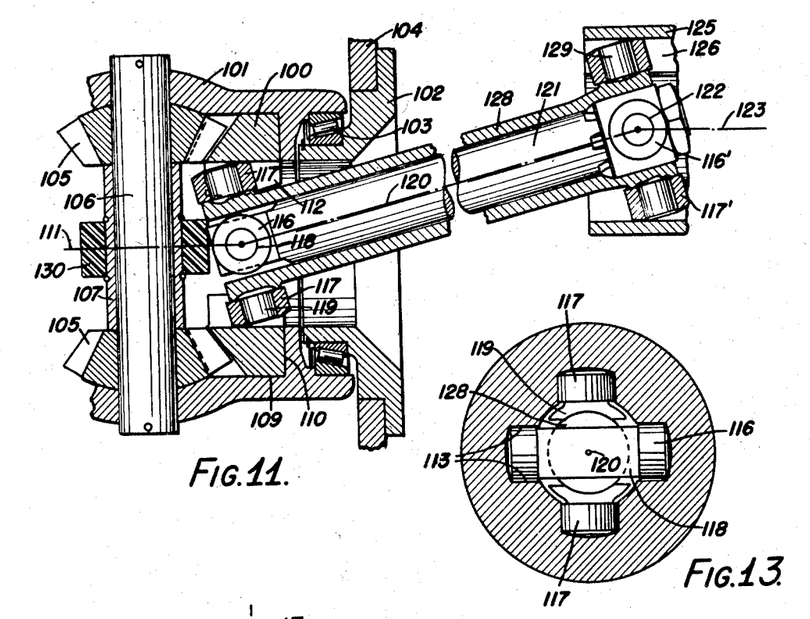
Fig. 11 is an axial section illustrating an application of my invention to a universal joint drive with two parallel shafts.
Fig. 13 is a section on the line 13—13 of Fig. 12.
Figure 12:
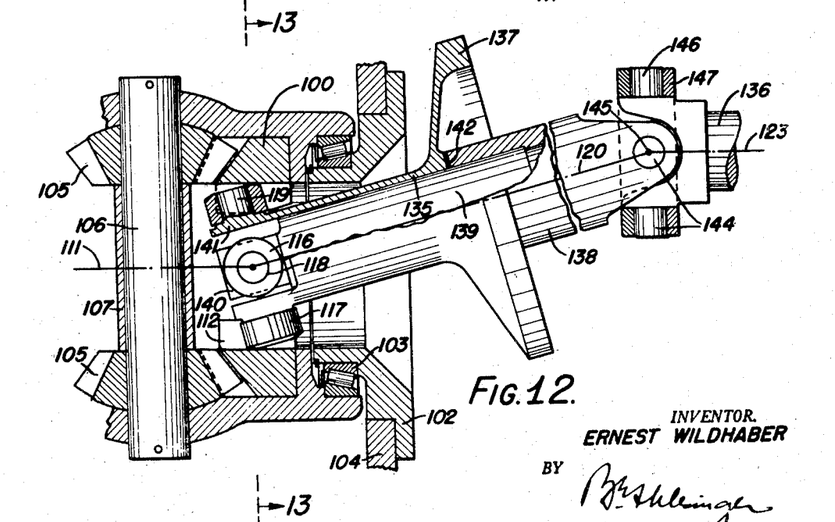
Fig. 12 is a part axial section, part plan view showing a different application of my invention to a universal joint drive with parallel shafts and capable of avoiding vibrations.

Only a part of the differential is shown in Fig. 11. This may be of known construction. It comprises two side gears, of which one is shown at 100, a cage or planet carrier 101, and the planet pinions 105. The planet carrier may be driven in known manner. It is mounted by means of tapered roller bearings 103 on two inserts or plates, of which one is shown at 102. The insert 102 is rigidly secured to a relatively stationary part 104.

The planetary bevel pinions 105 are carried in cage 101 on a cylindrical pin 106 which is secured to the cage. The pinions are held in properly spaced relation by a spacer 107. Each side gear is journaled in the differential cage 101 with its cylindrical outside surface 109 and its plane back surface 110 abutting against corresponding surfaces on the cage.

Four grooves 112 are provided in the interior of side gear 100. They are equally spaced about the gear axis 111 (Fig. 13). They have plane sides 113 which are parallel to the gear axis 111. These sides are engaged by cylindrical rollers 116 and 117 which are carried by pivot studs 118, and 119, respectively. There are two rollers 116 mounted at opposite ends, respectively, of pivot member 118 and two rollers 117 mounted at opposite ends, respectively, of pivot member 119. The pivot members are axially fixed relative to one another so that the axes of rotation of the rollers intersect axis 120 in the same point. Each pivot is part of a Cardan-type joint connection and, because the slots engaged by the rollers of the two pivots are at right angles to one another, are of opposite phase.

The driven member or shaft is designated 125. Its axis is at 123. Where the axis 123 of the driven member is constrained to remain parallel to the axis 111 of the driver, which is the case in the embodiment disclosed in Fig. 11, two double Cardan-type joint connections of opposite phase may be used simultaneously as illustrated.

One connection is through the inner shaft 121 to which pivot member 118 is secured. The pivot member 118 is at one end of shaft 121. At its opposite end this shaft carries a pivot member 122 which is like pivot member 118 and parallel thereto. Pivot member 122 is rigidly secured to shaft 121 by means of a hub and spline connection. Mounted at opposite ends of pivot member 122 are cylindrical rollers 116' which engage plane-sided grooves 126 formed internally in hollow driven member 125. The grooves are similar to the straight grooves 112 engaged by rollers 116; and their sides are parallel to the axis 123 of driven member 125.

The two spaced pivot members 118, 122, their rollers 116, 116' and the grooves 112, 126 engaged thereby constitute two Cardan-type universal joints. As well known these are capable of transmitting uniform motion between two parallel shafts. The motion of the connecting shaft 121, however, is not uniform but subject to periodic variations in motion; and its inertia is apt, therefore, to cause vibrations.

This is avoided by the present invention. The oscillations of shaft 121, as compared with a shaft rotating uniformly at the same overall speed, are matched through the present invention by opposite and substantially equal oscillations of a sleeve member or hollow shaft 128. The shafts 121 and 128 are coaxial and rotatably mounted on each other in a relatively fixed axial position.

Shaft 128 is forked at its two ends to let pivot members of shaft 121 extend through the spaces between the furcations to engage in the grooves 112 and 126. The pivot member 119 is integral with one end of shaft 128 and a similar, parallel pivot member 129 is integral with the opposite end of this shaft. This latter pivot member carries rollers 117'. The axes of rotation of rollers 117 and 117' are perpendicular to the axis 120 of shaft 128 and intersect said axis. The axes of rollers 116 and 117 are in the same radial plane and intersect axis 120 in the same point. Likewise the axes of rollers 116' and 117' are in the same radial plane and intersect axis 120 in the same point.

Rollers 117' engage in the two grooves 126 of driven member 125 which alternate with the grooves 126 of that member that are engaged by rollers 116'. The grooves 126 engaged by rollers 117' are diametrically opposite, like those engaged by rollers 116'. The four grooves 126 are equally spaced about axis 123 of driven member 125 and have plane sides parallel thereto, and are like the grooves 112 of gear 100. Each pair of grooves 126 is at ninety degrees to the adjacent pair of grooves so that a phase difference of 90° is attained as in the previously described embodiments of the invention.

The two spaced pivot members 119, 129, their rollers 117, 117', the grooves 112, 126 engaged thereby, and the hollow shaft 128 constitute a Cardan-type universal joint drive which is capable of transmitting uniform motion between the parallel axes 111 and 123. The speed oscillations of shaft 128, that is, its departure from uniform motion is, however, opposite to the departure from uniform motion of coaxial shaft 121. Vibrations are, therefore, avoided; and mass-balance is attained when the moments of inertia of shafts 121 and 128 and their attached parts are substantially equal. Moreover, the two coaxial shafts, because they have four rollers at each end, have more load capacity than a single shaft, which would fit into the same space and which has only two rollers at each end.

In the embodiment illustrated in Fig. 11, the joints are of axially free type at both ends of the connecting shafts 121—128. Stops may be used to prevent disengagement. One such stop is shown in the form of an oil-proof synthetic rubber ring 130 which is secured to spacer 107.

In the embodiment of the invention illustrated in Figs. 12 and 13, the same two Cardan-type joint connections of opposite phase are used at the gear end as already described. Here, however, the pivot member 119 is integral with a sleeve 135 which constitutes simply an inertia member and has no operative connection at all with the driven member here denoted 136. It is made with a thinner section than shaft 128 of Fig. 11; and it has integral with it a mass rim 137. Sleeve member 135 is rotatably mounted on a shaft 139. Sleeve 135 with its rim 137 is so made that the inertia moment of the sleeve and its attached parts, with respect to axis 120 of sleeve 135 and of shaft 139, is equal to the inertia moment of the shaft 139 and attached parts.

Shaft 139 carries pivot member 118. Sleeve 135 is mounted on shaft 139 in an axially fixed position so that the axes of rollers 116 and 117 carried by the pivot members 118 and 119, respectively, intersect axis 120 in the same point. Shaft 139 and sleeve 135, therefore, have Cardan-type universal joint connections with side gear 100. The two connections are of opposite phase since the grooves 112 in the gear engaged by rollers 116 and 117 are 90° apart.

Shaft 139 is rigidly secured to a hollow shaft 138 for instance by welding after sleeve 135 has been mounted on the shaft 139. Interposed between shaft 138 and sleeve 135 is a bronze bearing ring 142. The shaft 138 is connected with the driven shaft 136 by a known Cardan joint 144 of the axially fixed type. The pivot member 145, which is connected to hollow shaft 138, or is formed integral with it, is parallel to pivot member 116; and this pivot member is operatively connected to a pivot member 146 by means of a split-ring 147. The axis of pivot member 145 extends at right angles to the axis of pivot member 146.

Here, then, one end of the connecting member 139 is free axially and may move along the axis 111 of side gear 100 while the other end is preferably fixed axially. Here the mass-balance member 135 is connected with side gear 100 through a Cardan-type joint of different phase from the connection of shaft 139 with the gear. The mass balance attained with this embodiment is as complete as with the embodiment already described. Likewise, self-centering of the coaxial members 135, 139 is attained. The mass-balance member takes out vibrations and uniform motion at the parallel shaft members is, therefore, attained.

An important further application of my invention will now be described. It relates to universal joint drives with two or even more universal joints in which the axes of the end shafts are free of restrictions. They do not have to stay parallel; nor do they have to stay in the same plane. They may be tilted in different planes with respect to the axis of the connecting shaft or element. I have discovered that in any universal joint drive with two or more joints, uniform motion may be transmitted with the use of only a single equalizer or differential. In other words, the two (or more) joints of the drive may have a single or common equalizer. This is so, provided that the equalizer is coaxial with one of the two end shafts.

Figures 14, 15, 16:
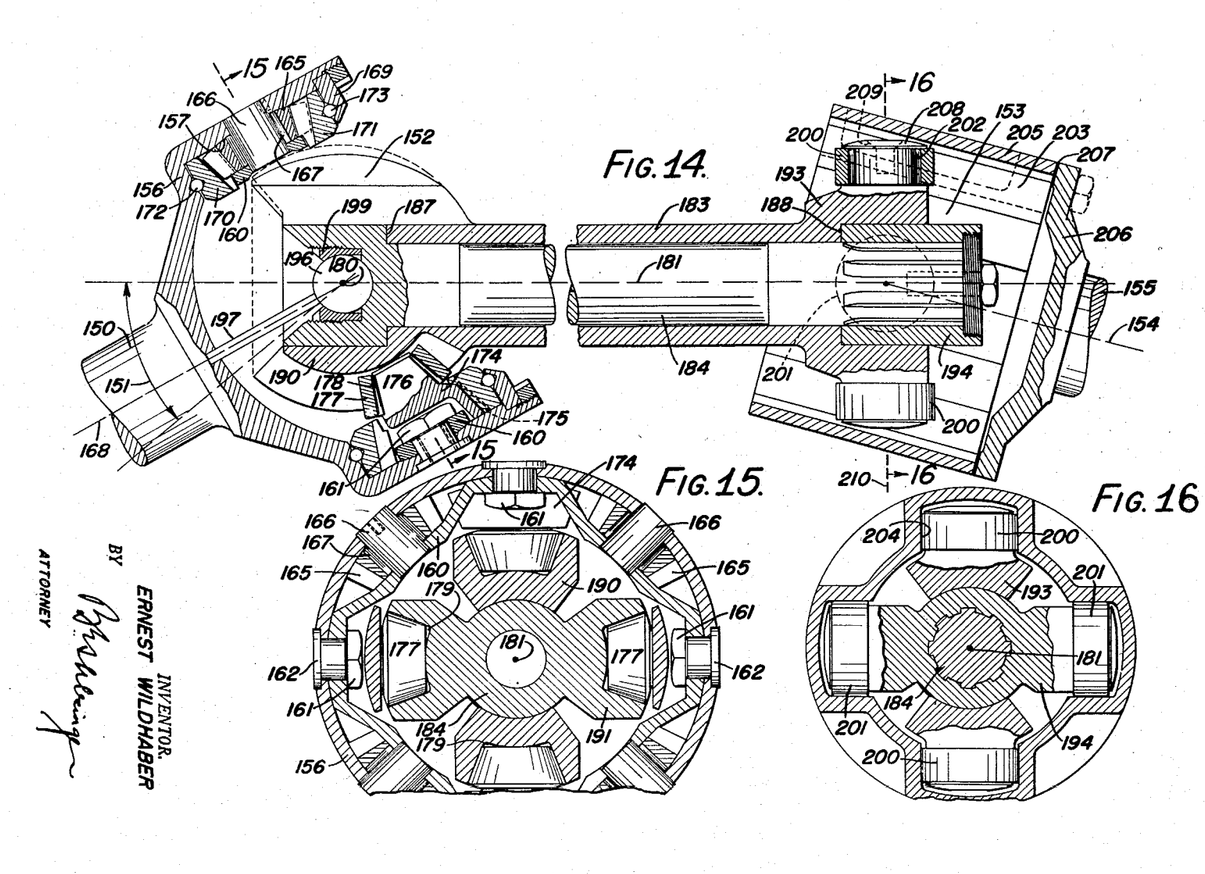
Fig. 14 is an axial sectional view showing an application of my invention to an automotive front-wheel drive.
Fig. 15 is a section on the line 15—15 of Fig. 14 with the axes of the joint shown in alignment.
Fig. 16 is a section approximately on the line 16—16 of Fig. 14 with the axes of the joint shown in alignment.

In Figs. 14, 15 and 16 this modification of the invention as applied to an automotive front-wheel drive is shown.

150 is the shaft that drives the front wheel. This shaft is intended to be turned through a large angle 151 for steering. The universal joint 152 is then the high-angle joint of the drive. The other joint 153 of the drive is located nearer to the longitudinal center line of the vehicle and subjected to smaller shaft angularities.

In the embodiment illustrated, the equalizer is in the form of a differential and is coaxial with end shaft 150. It is placed at the high-angle joint 152 which is axially fixed. The low-angle joint 153 is axially free so that the joint elements can adjust themselves along axis 154 of the other end shaft 155 of the drive. This shaft is coaxial with a similar shaft (not shown) which drives the opposite front wheel. The drive to this other wheel may be applied through another known-type differential.

Shaft 150 of joint 152 has an annular head 156 which has a spherical inside surface 157. To the inside of the head 156 there is secured a reinforcing member 160 (Fig. 15) through the medium of nuts 161 and flange-headed bolts 162. Member 160 is thin-walled and can be sufficiently deformed to get it into the shallow spherical recess 157 without stressing it beyond its elastic limit. If desired such elastic deformation may be avoided by making member 160 with a cylindrical outside surface of a diameter equal to the diameter of the cylindrical inside surface of head 156, and by using spherical washers for contact with the spherical inside surface 157.

Bevel pinions 165 are mounted in pockets formed in the head 156 and reinforcing member 160. They are mounted to turn on radial pins 166 which fit in aligned holes provided in head 156 and reinforcing member 160. The pinions may be mounted by means of anti-friction rollers 167 on the pins 166. Each pinion has a spherical outer end surface, that bears against the inside spherical surface 157 of the head, and a plane front surface that bears against a similar surface on reinforcing member 160.

The pinions 165 mesh with two side gears 170, 171 which are mounted to rotate independently of one another about the axis 168 of shaft 150. They are here mounted on annular rows of balls 172, 173, respectively, which engage V-shaped grooves in head 156 and a ring 169, respectively. The gears are positively separated by the pinions and do not need to be held further from displacement towards each other.

Each side gear has two diametrically opposite projections 174 rigidly secured to it or formed integral with it. In the structure shown in Fig. 14, the gears 170, 171 have teeth all around their circumferences and adjacent the projections, the teeth are cut away for most of their depth, leaving only short stubs 175. The side surface of a projection is slotted to match the stubbed teeth; and the projections may be rigidly secured to the gear by welding, or by screws or other suitable fastening means.

At their inner ends, the projections 174 have conical pins 176. The two conical pins 176 of each side gear are coaxial; and their common axis constitutes a pivot axis of a Cardan-type joint. Mounted on the pins 176 are conical rollers 177 whose apices are on the axis of shaft 150. The conical rollers 177 may be mounted on pins 176 by means of tapered needles 178.

Each roller 177 engages the conical sides of a groove 179 formed about an axis 180 perpendicular to the roller axis and perpendicular to the axis 181 of the means connecting the two joints 152 and 153. This means comprises two coaxial shafts 183 and 184, the shaft 183 being in the form of a sleeve mounted on shaft 184. These shafts are held against relative axial movement by the shoulders 187 and 188 formed on shafts 184 and 183.

Shaft 184 has at one end a head 191; and shaft 183 has at one end a head 190. These heads, which form parts of joints 152, have diametrically opposite wing-like projections; and the grooves 179, which are engaged by the rollers 177, are formed in these projections.

The two end members or heads 190, 191 are mounted in an axial position such that the axes of their roller grooves 179 intersect each other and intersect the roller axes in a common apex. The four conical rollers 177 keep the coaxial end members 190, 191 centered. They do not, however, contrain axial alignment. The axial alignment may be achieved with the ball end 196 of a thin rod 197 which is rigidly secured to shaft 150. Rod 197 is thin enough to deflect. In doing so it lets the ball center move very slightly in a radial plane perpendicular to its axis. The ball, then, will not resist the centering effected through the multiple roller contact, but will maintain axial alignment. The ball end is mounted in a spherical bearing provided by a recess in shaft 184 and by a nut 199 which threads into that recess.

Joint 153 is particularly simple. It comprises a pair of rollers 200 mounted on coaxial radial pins of an end member or head 193, and a pair of rollers 201 mounted on coaxial radial pins of an end member or head 194. The end member 193 is integral with hollow shaft 183 and at the opposite end of the shaft from head 190. The end member 194 is as if integral with shaft 184 and at the opposite end of the shaft from head 191. The pin axes of the two end members 193 and 194 intersect the axis 181 of shafts 183, 184 at the same point and are perpendicular to said shaft axis.

Rollers 200 and 201 are mounted on their respective pins by rolling needles 202 (Fig. 14). These rollers engage four equi-angularly spaced straight ways 203 provided internally on a member 205. This member is rigidly secured to a flange 206 provided on shaft 155. Face coupling teeth 207 add to the rigidity of the connection so that the member 205 is, as it were, integral with shaft 155. The sides 204 of the ways 203 are plane surfaces parallel to the axis 154 of shaft 155.

The drive as illustrated in Figs. 14 to 16 inclusive is specificially designed for a maximum shaft angularity of 40° of joint 152, a maximum shaft angularity of 20° of joint 153, and a total axial freedom of 1.5 inches of joint 153. The roller members 193, 194 are free to move jointly along axis 154, three-quarters of an inch in each direction from the shown position. Obviously joints can be designed for other shaft angularities and axial displacements.

The movement in the equalizer, that is, the turning motion of the two side gears is the accumulated motion resulting from both joints. In the application to front-wheel drives the connecting shafts 183, 184 swing substantially up and down about joint 153 and describe substantially a vertical plane. Steering is about a nearly vertical axis so that shaft 150 describes substantially a horizontal plane with respect to axis 181. Under these conditions, the movement in the equalizer is ordinarily the directed added motion $\Delta\theta$ of both joints. The resultant turning displacement $\Delta\theta_m$ is essentially the sum $(\Delta\theta'_m + \Delta\theta''_m)$ of the individual displacements as given by Equation 2. I have found that it can be made the difference $(\Delta\theta'_m - \Delta\theta''_m)$ rather than the sum by a phase difference of 90° between the two joints 152 and 153. This follows from an examination of Equation 1.

Thus, the pin axis 210 of part 193 should be perpendicular to the axis 180 about which the grooves of part 190 are formed, which part is rigidly connected with part 193. A similar requirement holds true for parts 191 and 194 at opposite ends of shaft 184.

At least one end part of the inner shaft 184 is detachably secured to its shaft for assembly. Thus part 194 may be rigidly secured by means of splines to shaft 184.

Joint 152 is generally similar to joint 47 (Figs. 6 and 7) already described. Joint 47 could be used in its place provided that the two pairs of raceways 76 for the conical rollers 73 were provided on a pair of coaxial members that were movable relatively to one another about their common axis. Likewise, joint 152 could be used in place of the single joint 47 if the two pairs of race-ways 179 for its conical rollers 177 were provided on a single member instead of the two members 190 and 191.

Any suitable known dust protection and grease seals may be used with my joint drive. They are not shown as they do not form part of the present invention. My joint drive is preferably designed to last as long as the vehicle, without replacement or repair and with very little attention. Pure rolling contact exists in joint 152 so that wear in minimized. Pure rolling contact exists, also, at the middle of the cylindrical rollers 200, 201 of joint 153; and little sliding at the roller ends. It is easy to design this drive not to wear out.

The two pairs of rollers of each joint are self-centering and are constrained by the equalizer to transmit equal loads. This adds to the load capacity and long life. This drive compares in ruggedness, in endurance, and in weight with drives having two Cardan joints with needle bearings or roller bearings; but this drive transmits uniform motion.

While the invention has been described in connection with particular embodiments thereof, it is capable of further modification; and this application is intended to cover any variations, uses, or adaptations of the invention following, in general, the principles of the invention and including such departures from the present disclosure as come within known or customary practice in the art to which the invention relates and as may be applied to the essential features hereinbefore set forth and as fall within the scope of the invention or the limits of the appended claims.

Having thus described my invention, what I claim is:

1. A universal joint drive comprising a rotary drive element and a rotary driven element, a pair of coaxial shafts, a pair of projections adjacent one end of each shaft, said projections being at corresponding ends of the two shafts, a pair of parts mounted on each pair of said projections to rotate about an axis perpendicular to and intersecting the axis of said shafts, the axes of said two pairs of parts intersecting the shaft axis at the same point, one of said elements being provided with grooves extending along axial planes in which said parts engage, said grooves being equi-spaced about the axis of said element, and one of said shafts being pivotally connected at the end opposite the projections to the other of said elements.

2. A universal joint drive comprising a rotary drive element and a rotary driven element, a pair of coaxial shafts, a pair of projections on each shaft at each end thereof, a pair of parts mounted on each pair of projections to rotate about an axis perpendicular to and intersecting the axis of said shafts, the axis of one pair of parts at one end of the shafts intersecting the axis of the other pair of parts at the same end of the shafts in a point on the shaft axis, each of said elements having four grooves therein extending along axial planes in which the two pairs of parts at one end of the shafts engage, the four grooves of each element being equi-spaced about the axis of that element.

3. A universal joint drive comprising a rotary drive element and a rotary driven element, a pair of coaxial shaft members, one of which is journalled within the other, a pair of projections formed on the two members at corresponding ends thereof, a pair of oscillatable parts mounted on each pair of projections to rotate about an axis perpendicular to and intersecting the axis of said shaft members, the axis of one pair of parts intersecting the axis of said shaft members in the same point as the axis of the other pair of parts, one of said elements having four grooves therein extending along axial planes in which the two pairs of parts engage, the four grooves being equi-spaced about the axis of said one element, an inertia member secured to the outer of the two coaxial shaft members, and a universal joint for connecting the inner member to the other element.

4. A universal joint drive comprising a rotary drive element and a rotary driven element, a pair of coaxial shafts which are rotatable but axially fixed relative to one another, a pair of projections on each shaft at corresponding ends of the two shafts, each of said projections having a groove formed therein, extending along an axial plane of the shafts, a pair of members mounted on one of said first two elements for oscillation relative thereto about the axis of said one element, a pair of rollers connected to each of said members engaging in said grooves, the two pairs of rollers being mounted to rotate about axes perpendicular to the axis of said one element and intersecting at the axis of said one element, and equalizing means connecting said one element with said two members and transmitting the average motion of said members to and from said one element.

5. A universal joint drive comprising a rotary drive element and a rotary driven element, a pair of coaxial shafts which are rotatably mounted but axially fixed relative to one another, a pair of members coaxial with one of said first two elements and adapted to oscillate relative thereto about the axis of said one element, four grooves and four rollers engaging therein for connecting said two members with the two shafts, two of one set of said four interengaging parts being carried by each of said members, two of the other set of the four interengaging parts being carried by each of said shafts, two concentric universal joints connecting the two shafts with the other of the first two elements, said universal joints being of different phase, and equalizing means connecting said two members and transmitting the average motion of said members to and from said one element.

6. A universal joint drive comprising a rotary drive element and a rotary driven element, a pair of coaxial shafts which are rotatable but axially fixed relative to one another, a pair of members coaxial with one of said first two elements and adapted to oscillate relative thereto about the axis of said one element, each of said shafts having at one end two diametrically opposed grooves extending along axial planes of the shafts, a pair of rollers carried by each of said members, the four rollers engaging in the four grooves, the rollers of each member being diametrically opposed, equalizing means comprising said members and transmitting the average motion of said members to and from said one element, a pair of rollers carried by each of said shafts at its opposite end, said other element having four internal grooves in which the rollers engage, the four last-named grooves being equally spaced about the axis of said other element and having plane sides extending in the direction of said last-named axis.

7. A universal joint drive comprising a rotary drive element and a rotary driven element, a pair of coaxial connecting members, a differential coaxial with one of said elements and operatively connected thereto, a pair of universal joints of different phase connecting said differential with the pair of connecting members, and a second pair of universal joints connecting said members with the other of said elements.

8. A universal joint drive having a drive element and a driven element, and means for connecting said elements comprising two coaxial members movable relative to one another about their common axis, two pairs of rollers and two pairs of guideways engaged by said rollers, two pairs of said engaging parts forming part of one of said elements and being equally spaced about said one element, and one pair of the other of said two pairs forming part of each of said two coaxial members, and a shaft pivotally connected to one of said two members.

9. A universal joint drive having a drive element and a driven element, means for connecting said elements comprising two coaxial members movable relative to one another about their common axis, two spaced universal joints for pivotally connecting said members with said two elements, each of said universal joints having cooperating parts comprising two pairs of rollers and two pairs of guideways engaged by said rollers, two pairs of said cooperating parts of each joint forming part of one of said elements, and one pair of the other of said two pairs of cooperating parts of that joint forming part of each of said two coaxial members.

10. A universal joint for connecting two relatively movable elements, comprising a pair of members coaxial with one of said elements and mounted to oscillate relative to one another about the axis of said one element, a second pair of coaxial members mounted to oscillate relative to one another about their common axis, and means connecting the two members of each pair, respectively, with the two members of the other pair.

11. A universal joint for connecting two relatively movable elements, comprising a pair of members coaxial with one of said elements and mounted to oscillate relative to one another about the axis of said one element, a second pair of coaxial members mounted to oscillate relative to one another about their common axis, means connecting the two members of each pair, respectively, with the two members of the other pair, and equalizing means for transmitting the average motion of the first pair to and from said one element.

12. A universal joint for connecting two relatively movable elements, comprising a pair of members coaxial with one of said elements and mounted to oscillate relative to one another about the axis of said one element, a second pair of coaxial members mounted to oscillate relative to one another about their common axis, means connecting the two members of each pair, respectively, with the two members of the other pair, and equalizing means for transmitting the average motion of the first pair to and from said one element, said equalizing means comprising parts coaxial with one of said elements.

13. A universal joint for connecting two relatively movable elements, comprising a pair of members coaxial with one of said elements and mounted to oscillate relative to one another about the axis of said one element, a pair of parts mounted on each of said members for oscillation thereon about a common axis perpendicular to the axis of said one element, said parts being disposed at diametrically opposite sides of the axis of said one element, and a pair of coaxial members mounted to oscillate relative to one another about a common axis, each of the last-named members being provided with a pair of ways that engage the parts carried, respectively, by one of the first-named members.

14. A universal joint for connecting two relatively movable elements, comprising a pair of members coaxial with one of said elements and mounted to oscillate relative to one another about the axis of said one element, a pair of parts mounted on each of said members for oscillation thereon about a common axis perpendicular to the axis of said one element, said parts being disposed at diametrically opposite sides of the axis of said one element, and a second pair of coaxial members mounted to oscillate relative to one another about their common axis, each of the last-named members being provided with a pair of ways that engage the parts carried, respectively, by one of the first-named members, and equalizing means comprising said first-named members for transmitting their average motion to and from said one element.

15. A universal joint drive comprising a rotary drive element and a rotary driven element, a pair of coaxial connecting members oscillatable relative to one another about their common axis, a pair of concentric universal joints of different phase connecting said two members with said drive element, a pair of concentric universal joints of different phase connecting said two members with said driven element, and a single equalizing means coaxial with one of said two elements for transmitting the average motion to and from said one element.

16. A universal joint drive comprising a rotary drive element and a rotary driven element, a pair of coaxial connecting members axially fixed relative to one another and oscillatable relative to one another about their common axis, a pair of concentric universal joints of different phase connecting said two members with said drive element, a pair of concentric universal joints of different phase connecting said two members with said driven element, and a single equalizing means coaxial with one of said two elements for transmitting the average motion to and from said one element.

17. A universal joint drive comprising a rotary drive element and a rotary driven element, a pair of coaxial connecting members axially fixed relative to one another and oscillatable relative to one another about their common axis, a pair of concentric universal joints of different phase connecting said two members with said drive element, a pair of concentric universal joints of different phase connecting said two members with said driven element, and a single equalizing means having portions disposed at opposite sides of the point of intersection of the axes of one of said elements and of said pair of connecting members for transmitting the average motion between said elements.

18. A universal joint drive comprising two spaced rotary elements having axes maintained approximately parallel, a pair of coaxial connecting shafts axially fixed relative to one another and oscillatable relative to one another about their common axis, one of said elements having four equally spaced internal grooves extending along axial planes, a pair of parts carried by each of said shafts at their ends that reach inside of said one element, each of said pairs being mounted for oscillation about an axis perpendicular to and intersecting the axis of said shafts, said parts engaging said grooves to add up to a pair of concentric universal joints, connecting said one element with said shafts, and a pair of concentric universal joints connecting the opposite ends of said shafts with the other of said two elements.

19. A universal joint drive comprising a rotary drive element and a rotary driven element, a pair of coaxial relatively oscillatable connecting members, means connecting each of said members with both elements, said means constituting two spaced universal joints, and means averaging the motion transmitted between said members and one of said elements.

20. A universal joint drive comprising a rotary drive element and a rotary driven element, a pair of coaxial relatively oscillatable connecting members, means connecting each of said members with both elements, and equalizing means having portions disposed at opposite sides of the point of intersection of the axes of one of said elements and said pair of connecting members for averaging the motion transmitted between said members and said one element.

21. A universal joint drive comprising a rotary drive element and a rotary driven element, a pair of coaxial relatively oscillatable connecting members, means connecting each of said members with both elements, and equalizing means having portions disposed at opposite sides of the point of intersection of the axes of one of said elements and said pair of connecting members for averaging the motion transmitted between said members and said one element, said equalizing means being coaxial with one of said elements and constituting part of the means for connecting said one element with said members.

22. A universal joint drive comprising two spaced rotary elements, a pair of coaxial relatively oscillatable members, a pair of concentric universal joints of different phase connecting one of said elements with said pair of members, and a universal joint for connecting at least one of said members with the other of said elements.

23. A universal joint drive comprising two spaced rotary elements, a pair of coaxial relatively oscillatable connecting members that are axially fixed to one another, a pair of concentric universal joints of different phase connecting one of said elements with said pair of members, and a further pair of concentric universal joints of different phase for connecting said members with the other of said elements.

24. Universal joint means for connecting two relatively movable elements, comprising a pair of relatively oscillatable connecting members, and separate means for pivotally connecting each of said members, respectively, with both of said two elements, the axes of the pivotal connections of said two members with each of said elements being angularly disposed to each other and intersecting each other, and the axes of pivotal connection of said two members with one of said two elements being spaced from the axes of pivotal connection of said two members with the other of said elements.

References Cited in the file of this patent

UNITED STATES PATENTS

| 1,498,678 | Chavrier | June 24, 1924 |
| 2,709,902 | Wildhaber | June 7, 1955 |

FOREIGN PATENTS

| 250,987 | Switzerland | July 16, 1948 |

UNITED STATES PATENT OFFICE
CERTIFICATE OF CORRECTION

Patent No. 2,819,597                          January 14, 1958

Ernest Wildhaber

It is hereby certified that error appears in the printed specification of the above numbered patent requiring correction and that the said Letters Patent should read as corrected below.

Column 3, lines 44 and 45, the equation should appear as shown below instead of as in the patent:

$$\tan \Delta\theta = \frac{M \sin 2\theta}{1 - M \cos 2\theta}$$

Signed and sealed this 11th day of October 1960.

(SEAL)
Attest:
KARL H. AXLINE
Attesting Officer

ROBERT C. WATSON
Commissioner of Patents